(12) United States Patent
Brelsford et al.

(10) Patent No.: US 9,723,070 B2
(45) Date of Patent: Aug. 1, 2017

(54) SYSTEM TO IMPROVE CLUSTER MACHINE PROCESSING AND ASSOCIATED METHODS

(75) Inventors: David Paul Brelsford, Hyde Park, NY (US); Waiman Chan, Poughkeepsie, NY (US); Alexander Druyan, Brooklyn, NY (US); Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 1974 days.

(21) Appl. No.: 12/023,584

(22) Filed: Jan. 31, 2008

(65) Prior Publication Data
US 2010/0293549 A1 Nov. 18, 2010

(51) Int. Cl.
*H04L 29/08* (2006.01)
*G06F 9/50* (2006.01)

(52) U.S. Cl.
CPC .......... *H04L 67/1008* (2013.01); *G06F 9/505* (2013.01); *G06F 9/5066* (2013.01); *G06F 9/5072* (2013.01); *H04L 67/1002* (2013.01)

(58) Field of Classification Search
CPC .................................................. G06F 9/5066
USPC .......................................................... 709/218
See application file for complete search history.

(56) References Cited

U.S. PATENT DOCUMENTS

| | | | | |
|---|---|---|---|---|
| 5,053,950 A | * | 10/1991 | Naganuma et al. | 718/105 |
| 5,351,146 A | * | 9/1994 | Chan | H04J 14/0227 370/408 |
| 5,740,371 A | * | 4/1998 | Wallis | 709/229 |
| 5,774,668 A | * | 6/1998 | Choquier et al. | 709/223 |
| 5,812,529 A | * | 9/1998 | Czarnik et al. | 370/245 |
| 5,867,706 A | * | 2/1999 | Martin et al. | 718/105 |
| 6,128,279 A | * | 10/2000 | O'Neil et al. | 370/229 |
| 6,684,121 B1 | * | 1/2004 | Lu | G05B 19/41865 700/108 |
| 6,829,764 B1 | * | 12/2004 | Cohen | G06F 9/5066 718/103 |

(Continued)

OTHER PUBLICATIONS

Chiang, Su-Hui, and Chuyong Fu. "Re-evaluating reservation policies for backfill scheduling on parallel systems." 16th IASTED Int'l Conf. on Parallel and Distributed Computing and Systems (PDCS). 2004.*

(Continued)

*Primary Examiner* — Jimmy H Tran
(74) *Attorney, Agent, or Firm* — Ido Tuchman; Damion Josephs

(57) ABSTRACT

A system to improve cluster machine processing that may include a plurality of interconnected computers that process data as one if necessary, and at least one other plurality of interconnected computers that process data as one if necessary. The system may also include a central manager to control what data processing is performed on a shared processing job performed by the plurality of interconnected computers and the at least one other plurality of interconnected computers. Each of the plurality of interconnected computers runs parallel jobs scheduled by a local backfill scheduler. In order to schedule a cluster spanning parallel job, the local schedulers cooperate on placement and timing of the cluster spanning job, using existing backfill rules in order not to disturb the local job streams.

18 Claims, 7 Drawing Sheets

(56) References Cited

U.S. PATENT DOCUMENTS

| | | | | |
|---|---|---|---|---|
| 7,080,385 | B1* | 7/2006 | Collison | G06F 9/542 719/310 |
| 7,082,606 | B2* | 7/2006 | Wood | G06F 9/5038 700/100 |
| 7,533,384 | B2* | 5/2009 | Chan | G06F 9/4843 707/999.001 |
| 7,716,336 | B2* | 5/2010 | Coppinger | G06F 9/505 709/201 |
| 8,136,115 | B2* | 3/2012 | Skovira | G06F 9/5038 709/203 |
| 8,239,844 | B2* | 8/2012 | Stefansson | G06F 9/5027 717/149 |
| 8,239,846 | B2* | 8/2012 | Luszczek | G06F 9/5027 717/149 |
| 8,332,268 | B2* | 12/2012 | Carruthers et al. | 705/14.52 |
| 2001/0034792 | A1* | 10/2001 | Swildens | H04L 29/06 709/238 |
| 2002/0032762 | A1* | 3/2002 | Price et al. | 709/223 |
| 2002/0194248 | A1* | 12/2002 | Wood | G06F 9/5038 718/102 |
| 2004/0199918 | A1* | 10/2004 | Skovira | 718/102 |
| 2005/0071842 | A1* | 3/2005 | Shastry | 718/100 |
| 2005/0289547 | A1* | 12/2005 | Chan | G06F 9/5044 718/101 |
| 2006/0095914 | A1* | 5/2006 | Mankovski | G06F 9/4843 718/100 |
| 2006/0236323 | A1* | 10/2006 | Neill et al. | 718/104 |
| 2007/0143758 | A1* | 6/2007 | Coppinger et al. | 718/102 |
| 2007/0180451 | A1* | 8/2007 | Ryan | G06F 9/505 718/104 |
| 2007/0244800 | A1* | 10/2007 | Lee | G06Q 10/06 705/37 |
| 2007/0255835 | A1* | 11/2007 | Coppinger | G06F 9/505 709/226 |
| 2008/0052715 | A1* | 2/2008 | Skovira | G06F 9/5038 718/102 |
| 2008/0080393 | A1* | 4/2008 | Kaler | H04L 12/66 370/254 |
| 2008/0215927 | A1* | 9/2008 | Roussel | G06F 11/0715 714/47.1 |
| 2008/0216077 | A1* | 9/2008 | Emani | G05B 19/41865 718/102 |
| 2009/0044180 | A1* | 2/2009 | Luszczek | G06F 8/314 717/149 |
| 2009/0044196 | A1* | 2/2009 | Stefansson | G06F 8/314 718/106 |
| 2009/0327669 | A1* | 12/2009 | Imada | G06F 8/433 712/226 |

OTHER PUBLICATIONS

Vydyanathan, Nagavijayalakshmi, et al. "An integrated approach for processor allocation and scheduling of mixed-parallel applications." Parallel Processing, 2006. ICPP 2006. International Conference on. IEEE, 2006.*

Li, Bo, and Dongfeng Zhao. "Performance impact of advance reservations from the grid on backfill algorithms." Grid and Cooperative Computing, 2007. GCC 2007. Sixth International Conference on. IEEE, 2007.*

Ward Jr, William A., Carrie L. Mahood, and John E. West. "Scheduling jobs on parallel systems using a relaxed backfill strategy." Workshop on Job Scheduling Strategies for Parallel Processing. Springer Berlin Heidelberg, 2002.*

Cheng et al., Scheduling in Parallel Systems With a Hierarchical Organization of Tasks, ACM International Conference on Supercomputing, pp. 377-386 (Jul. 1992).

Archalla et al., Load Balancing in Distributed Adaptive Task Partitioning, Proceedings of the Fifteenth IASTED International Conference on Parallel and Distributed Computing and Systems (Nov. 2003).

* cited by examiner

SYSTEM TO IMPROVE CLUSTER MACHINE PROCESSING AND ASSOCIATED METHODS

GOVERNMENT LICENSE RIGHTS

This invention was made with Government support under Agreement No. HR0011-07-9-0002 awarded by DARPA. The Government has certain rights in the invention.

FIELD OF THE INVENTION

The invention relates to the field of computer systems, and, more particularly, to cluster computing systems and related methods.

BACKGROUND OF THE INVENTION

Cluster computing is loosely defined as at least two computers connected together to cooperatively share a processing load. As a result, the cluster seems like a single entity, and the grouping of computers may be referred to as a cluster machine. The computers are usually joined by a shared communications network, e.g. local area network.

One advantage of cluster computing is that it may provide performance advantages over a single computer. Another advantage of a cluster computing is that it may be readily adapted to perform parallel processing.

An extension of the cluster computing concept is grid computing where the computers may be farther apart on a given network, e.g. the Internet, than in a traditional cluster machine. Additionally, the computers in a grid computing system may be more informally linked to one another than in a grid computing system.

SUMMARY OF THE INVENTION

In view of the foregoing background, it is an object of the invention to provide a system that improves cluster computing processing.

This and other objects, features, and advantages in accordance with the invention are provided by a system to improve cluster machine processing. The system may include a plurality of interconnected computers that process data as one if necessary. The system may also include at least one other plurality of interconnected computers that process data as one if necessary. The system may further include a central manager to control what data processing is performed on a shared processing job performed by the plurality of interconnected computers and the at least one other plurality of interconnected computers. In addition, the plurality of interconnected computers and the at least one other plurality of interconnected computers each control any respective local processing jobs.

The plurality of interconnected computers, the at least one other plurality of interconnected computers, and the central manager may be connected via a communications network. The plurality of interconnected computers and the at least one other plurality of interconnected computers may each perform any respective local processing jobs substantially in parallel to the shared processing job.

The system may also include a local manager to schedule data processing within the plurality of interconnected computers. The local manager may provide resource availability and backfill scheduling for the plurality of interconnected computers.

The system may further include at least one other local manager to schedule data processing within the at least one other plurality of interconnected computers. The at least one other local manager may provide at least one other resource availability and backfill scheduling for the at least one other plurality of interconnected computers.

The central manager may schedule the shared processing job based upon the backfill scheduling provided by the local manager, and the at least one other backfill scheduling provided by the at least one other local manager. The backfill scheduling provided by the local manager and the at least one other backfill scheduling provided by the at least one other local manager may be supplied substantially in parallel to the central manager.

The central manager may reserve time and/or resources on the plurality of interconnected computers and the at least one other plurality of interconnected computers to perform the shared processing job. The local manager may suspend backfill scheduling until the central manager distributes the shared processing job. Similarly, the at least one other local manager may suspend at least one other backfill scheduling until the central manager distributes the shared processing job.

Another aspect of the invention is a method to improve cluster machine processing. The method may include sending a request to perform a shared processing job from a central manager to a plurality of interconnected computers and at least one other plurality of interconnected computers. The method may also include determining available resources for the shared processing job by each of the plurality of interconnected computers and the at least one other plurality of interconnected computers, respectively. The method may further include reserving resources via the central manager on each of the plurality of interconnected computers and the at least one other plurality of interconnected computers, respectively, based upon the determined available resources for the shared processing job.

In addition, the method may also include performing any local processing jobs substantially in parallel to the shared processing job at the plurality of interconnected computers and the at least one other plurality of interconnected computers. The method may further include suspending backfill scheduling on each of the plurality of interconnected computers and the at least one other plurality of interconnected computers until the central manager distributes the shared processing job.

Furthermore, the method may include resuming backfill scheduling on each of the plurality of interconnected computers and the at least one other plurality of interconnected computers when the central manager distributes the shared processing job. The method may further include controlling portions of the shared processing job performed by each of the plurality of interconnected computers and the at least one other plurality of interconnected computers via the central manager during the shared processing job.

DETAILED DESCRIPTION OF THE PREFERRED EMBODIMENTS

Figure 1:
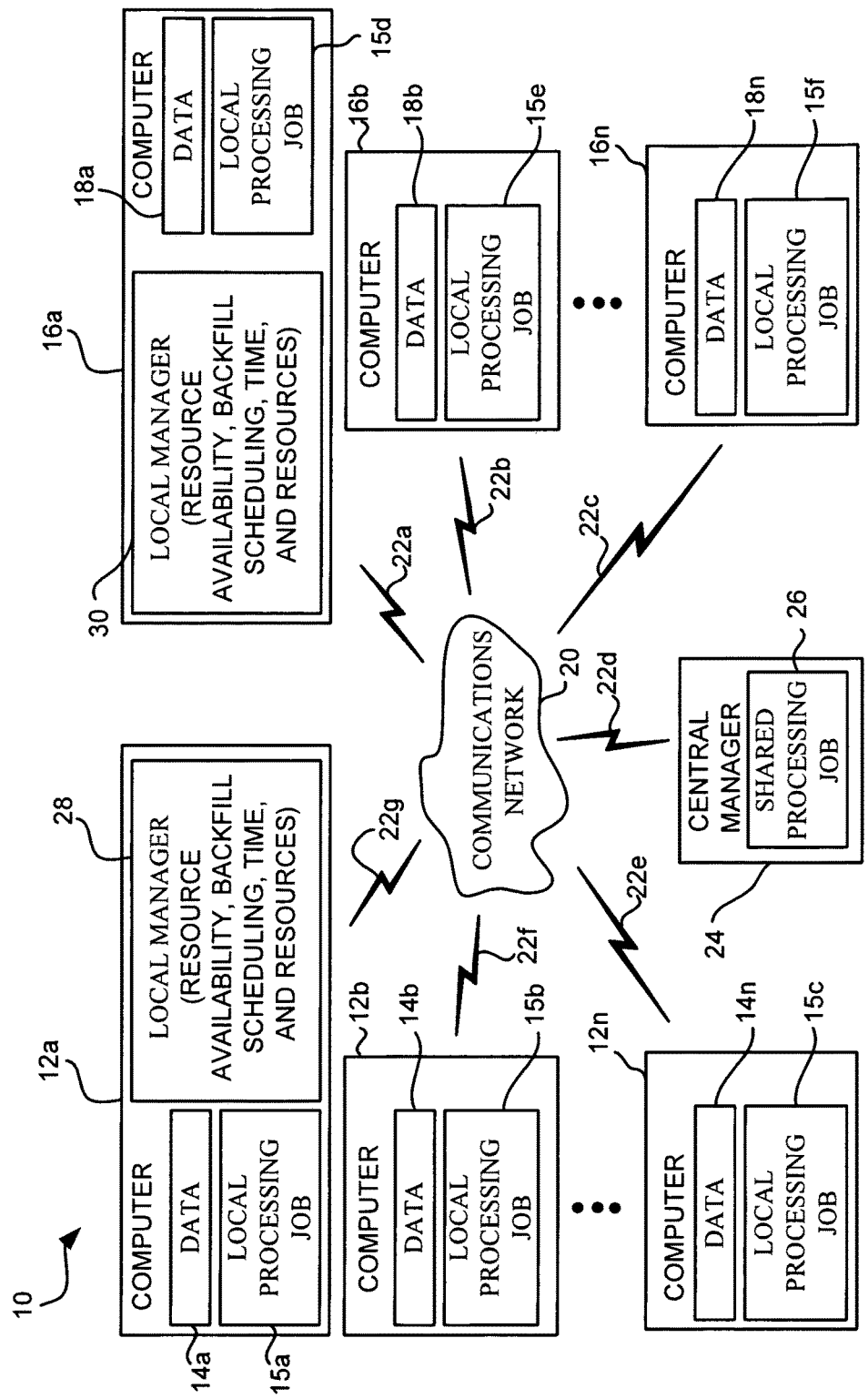
FIG. 1 is a schematic block diagram of a system to improve cluster computing processing in accordance with the invention.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring initially to FIG. 1, a system 10 to improve cluster machine processing is initially described. The system 10 includes a plurality of interconnected computers 12a-12n that process data 14a-14n as one if necessary, e.g. a cluster machine.

The computers 12a-12n are connected by communications network 20 over communications links 22e-22g, for example. The communications network 20 may be a wired and/or wireless network including private and public communications infrastructure as will be appreciated by those of skill in the art.

In one embodiment, the communications network 20 comprises a high performance communication network that is private to a given individual cluster, e.g. a plurality of interconnected computers such as 12a-12n or the like. In addition, each cluster resides on the grid to communicate over a common network. The common network usually has far less performance than the dedicated high speed cluster network which prevents a single scheduler from controlling grid connected clusters and imposes limits on how much communication grid tools may use when communicating between clusters in order to remain efficient and usable.

The system 10 also includes at least one other plurality of interconnected computers 16a-16n that process data 18a-18n as one if necessary, e.g. a cluster machine. The at least one other plurality of interconnected computers 16a-16n are connected by the communications network 20 over communications links 22a-22c, for example.

In one embodiment, the plurality of interconnected computers 12a-12n and the at least one other plurality of interconnected computers 16a-16n each control any respective local processing jobs 15a-15f. In other words, the plurality of interconnected computers 12a-12n and 16a-16n are grid-connected clusters, where each cluster is running a local manager 28 and 30, e.g. independent backfill schedulers.

In addition, the system 10 further includes a central manager 24 to control what data processing is performed on a shared processing job 26 performed by the plurality of interconnected computers 12a-12n and the at least one other plurality of interconnected computers 16a-16n. In one embodiment, one of the local managers 28 and 30 is designated as the central manager 24.

In one embodiment, the plurality of interconnected computers 12a-12n and the at least one other plurality of interconnected computers 16a-16n each performs any respective local processing jobs 15a-15f substantially in parallel to the shared processing job 26. In other words, the plurality of interconnected computers 12a-12n and the at least one other plurality of interconnected computers 16a-16n use parallel processing techniques.

The central manager 24 is hardware, firmware, and/or software that can be either a standalone unit or part of the plurality of interconnected computers 12a-12n and/or the at least one other plurality of interconnected computers 16a-16n. The central manager 24 uses communication link 22d to connect to the plurality of interconnected computers 12a-12n and the at least one other plurality of interconnected computers 16a-16n over communications network 20.

The system 10 also includes a local manager 28 to schedule data processing within the plurality of interconnected computers 12a-12n, for example. The local manager 28 is hardware, firmware, and/or software that can be either a standalone unit or part of the plurality of interconnected computers 12a-12n. In one embodiment, the local manager 28 provides resource availability and backfill scheduling for the plurality of interconnected computers 12a-12n.

The system 10 further includes at least one other local manager 30 to schedule data processing within the at least one other plurality of interconnected computers 16a-16n, for instance. The local manager 30 is hardware, firmware, and/or software that can be either a standalone unit or part of the at least one other plurality of interconnected computers 16a-16n. In one embodiment, the at least one other local manager 30 provides at least one other resource availability and backfill scheduling for the at least one other plurality of interconnected computers 16a-16n.

The central manager 24 schedules the shared processing job 26 based upon the backfill scheduling provided by the local manager 28, and the at least one other backfill scheduling provided by the at least one other local manager 30, for example. In one embodiment, the backfill scheduling provided by the local manager 28 and the at least one other backfill scheduling provided by the at least one other local manager 30 is supplied substantially in parallel to the central manager 24. In other words, the local manager 28 and the at least one other local manager 30 use parallel processing techniques.

The central manager 24 reserves time and/or resources on the plurality of interconnected computers 12a-12n and the at least one other plurality of interconnected computers 16a-16n to perform the shared processing job 26, for instance. Stated another way, the central manager 24 distributes components of the shared processing job 26 according to available resources on the plurality of interconnected computers 12a-12n and/or the at least one other plurality of interconnected computers 16a-16n.

The local manager 28 suspends backfill scheduling until the central manager 24 distributes the shared processing job 26, for example. Similarly, the at least one other local manager 30 suspends at least one other backfill scheduling until the central manager 24 distributes the shared processing job 26, for instance.

Figure 2:
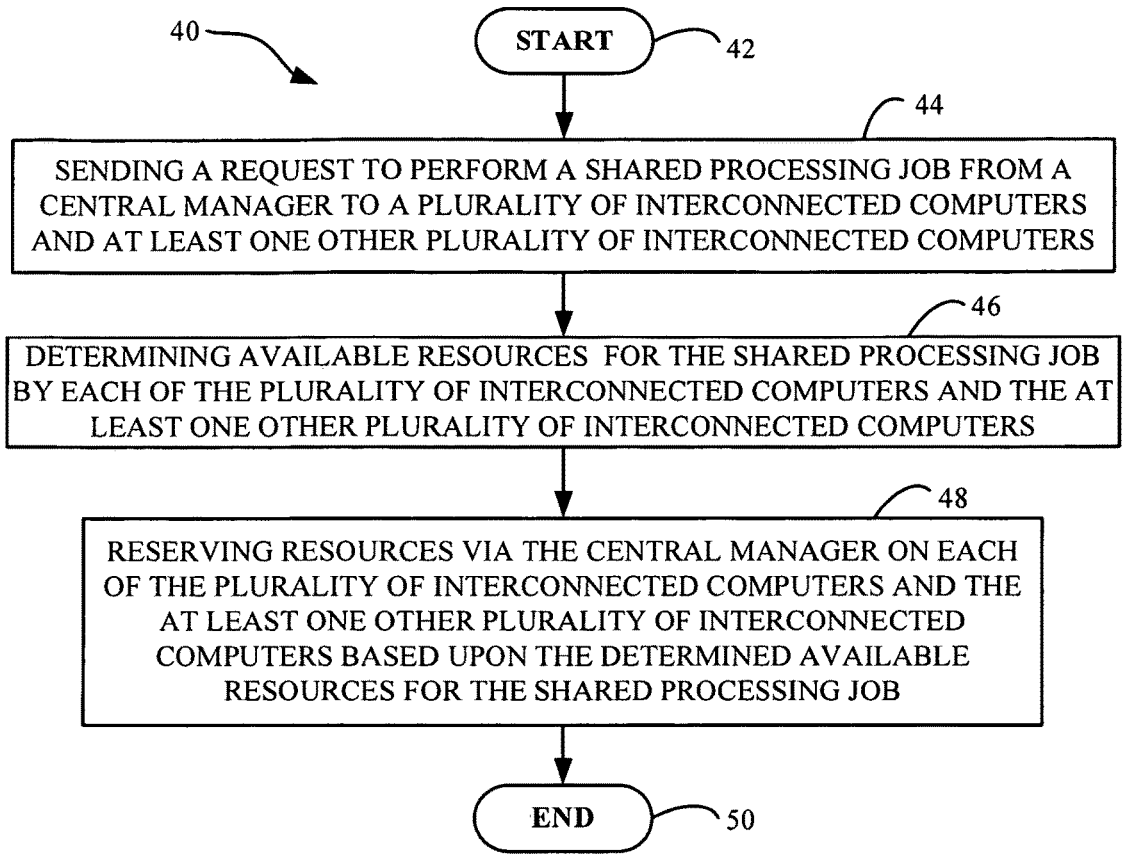
FIG. 2 is a flowchart illustrating method aspects according to the invention.

Another aspect of the invention is directed to a method to improve cluster machine processing, which is now described with reference to flowchart 40 of FIG. 2. The method begins at Block 42 and may include sending a request to perform a shared processing job from a central manager to a plurality of interconnected computers and at least one other plurality of interconnected computers at Block 44. The method may also include determining available resources for the shared processing job by each of the plurality of interconnected computers and the at least one other plurality of interconnected computers at Block 46. The method may further include reserving resources via the central manager on each of the plurality of interconnected computers and the at least one other plurality of interconnected computers based upon the determined available resources for the shared processing job at Block 48. The method ends at Block 50.

Figure 3:
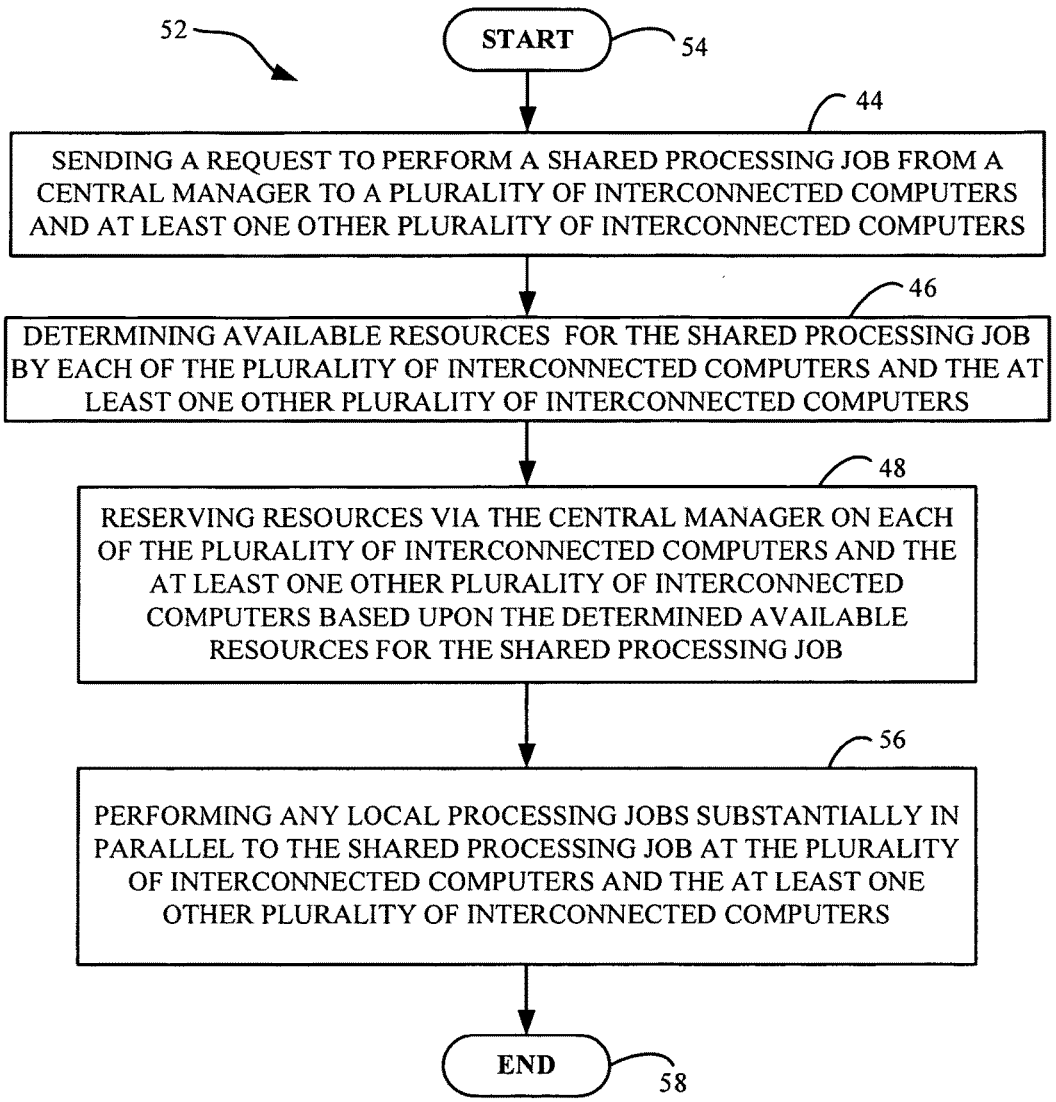
FIG. 3 is a flowchart illustrating method aspects according to the method of FIG. 2.

In another method embodiment, which is now described with reference to flowchart 52 of FIG. 3, the method begins at Block 54. The method may include the steps of FIG. 2 at Blocks 44, 46, and 48. The method may also include performing any local processing jobs substantially in parallel to the shared processing job at the plurality of interconnected computers and the at least one other plurality of interconnected computers at Block 56. The method ends at Block 58.

Figure 4:
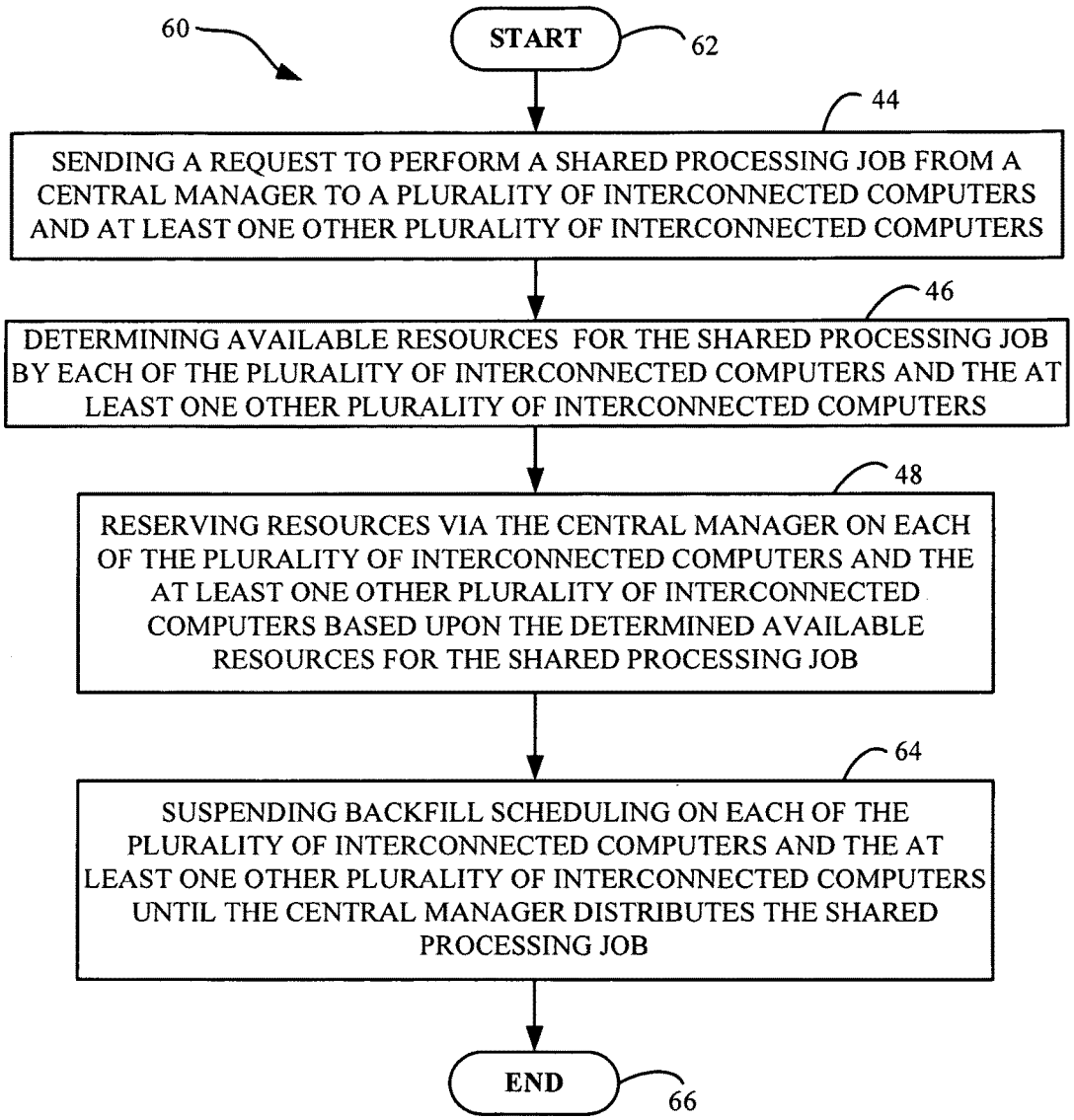
FIG. 4 is a flowchart illustrating method aspects according to the method of FIG. 2.

In another method embodiment, which is now described with reference to flowchart 60 of FIG. 4, the method begins at Block 62. The method may include the steps of FIG. 2 at Blocks 44, 46, and 48. The method may further include suspending backfill scheduling on each of the plurality of interconnected computers and the at least one other plurality of interconnected computers until the central manager distributes the shared processing job at Block 64. The method ends at Block 66.

Figure 5:
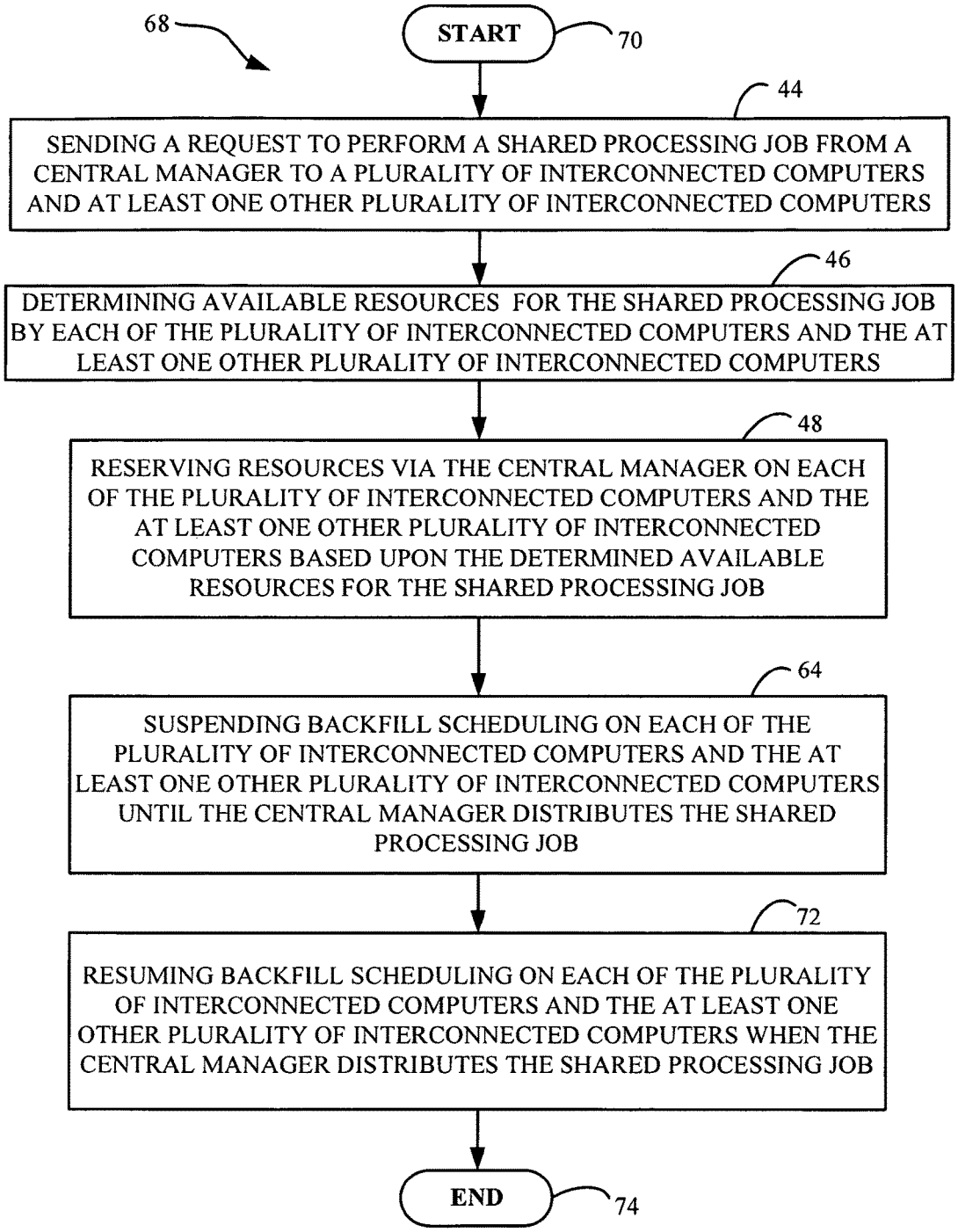
FIG. 5 is a flowchart illustrating method aspects according to the method of FIG. 4.

In another method embodiment, which is now described with reference to flowchart 68 of FIG. 5, the method begins at Block 70. The method may include the steps of FIG. 4 at Blocks 44, 46, 48, and 64. The method may further include resuming backfill scheduling on each of the plurality of interconnected computers and the at least one other plurality of interconnected computers when the central manager distributes the shared processing job at Block 72. The method ends at Block 74.

Figure 6:
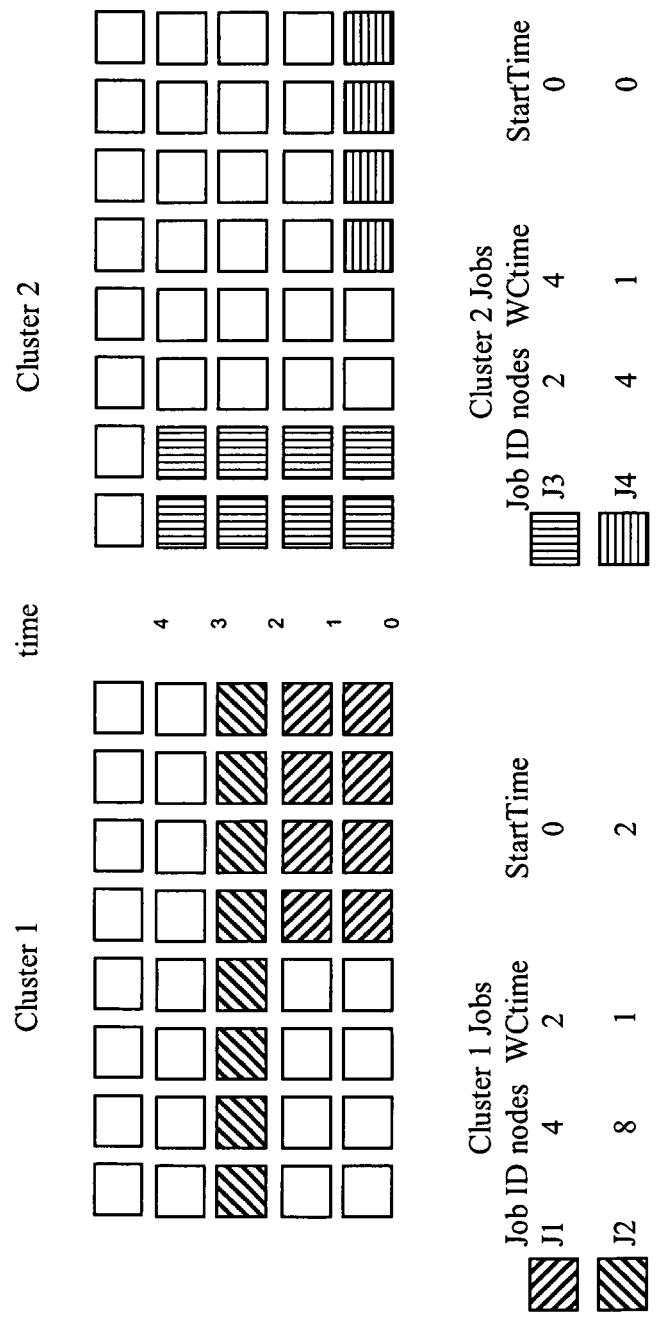
FIGS. 6 and 7 illustrate a prophetic example of an application of the system of FIG. 1.
Figure 7:
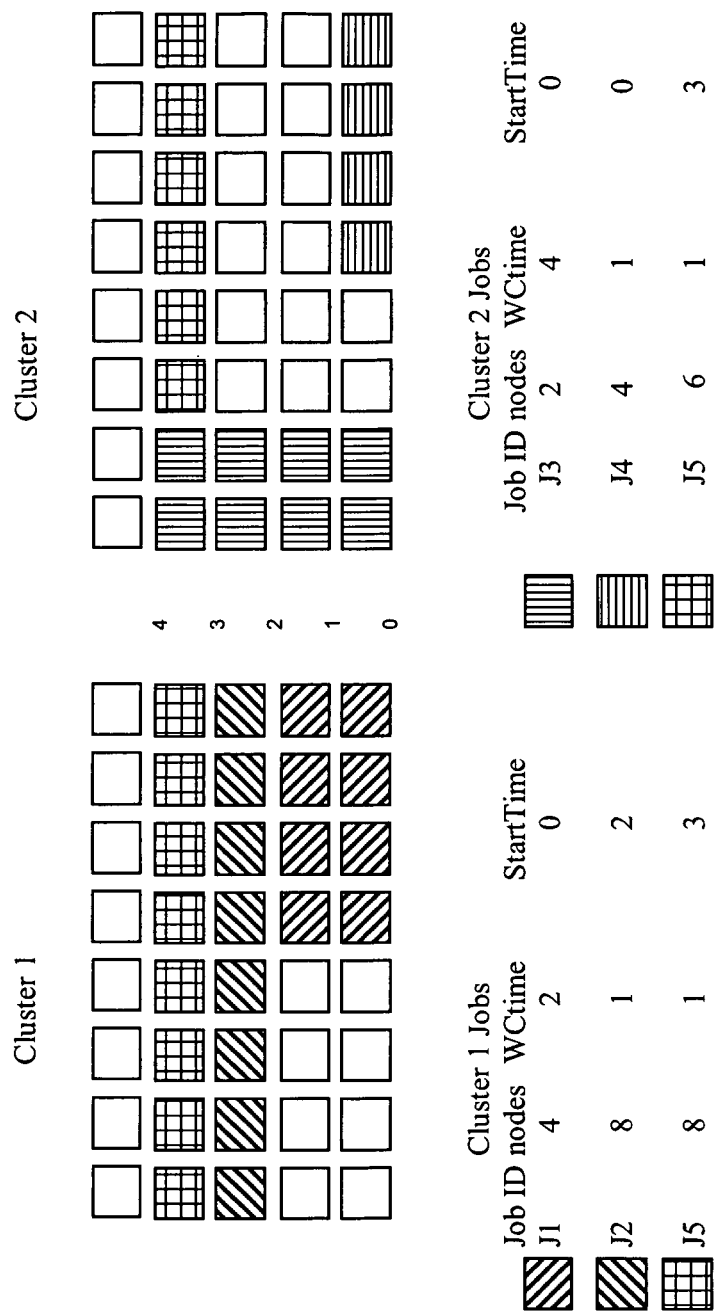

A prophetic example of how the system 10 may work is now described with additional reference to FIGS. 6 and 7. The system 10 uses local managers, e.g. 28 and 30, to allow a scale-across job, e.g. shared processing job 26, to be scheduled across multiple clusters, e.g. 12a-12n and 16a-16n. A central manager 24 requests a scale-across schedule of the shared processing job 26.

Each individual local manager 28 and 30 will return, to the central manager 24, a list of available resources along with the time spans that these resources are available. The central manager 24 combines these individual tables to form a solution for the shared processing job 26. Once the solution has been determined, the central manager 24 places the shared processing job 26 in the job queues of the appropriate clusters 12a-12n and 16a-16n.

In other words, a shared processing job 26 is submitted to a local manager 28 and 30 which assumes the role of central manager 24 for this job, and the central manager sends the request to all participating local managers.

The local managers 28 and 30 tabulate the resources that could, potentially, be used for this job. Note that this step, while easily written, describes the complex process of each backfill scheduler on the local scheduler determining possible contributions of resources taking local (parallel) jobs into account. In effect, this step parallelizes the step of searching for resources for the shared processing job 26. Since individual cluster schedulers are involved, they apply complex backfill techniques to the problem, operating in parallel on each of the local clusters 12a-12n and 16a-16n.

The local managers 28 and 30 suspend scheduling local jobs as they report back to the central manager 24. Each local manager 28 and 30 reports the tabulated results back to the central manager 24.

The central manager 24 combines the results for the local managers 28 and 30 and decides on a start time and resource list for the shared processing job 26. The central manager 24 informs each participating local manager 28 and 30 of its resource contribution list and the start time for the shared processing job 26. The local managers 28 and 30 add components of the shared processing job 26 to their job queues. The local managers 28 and 30 allow local scheduling to commence.

The following example illustrates the operation of the system 10. Given are two clusters with independent local job queues as illustrated in FIG. 6, and the following job is submitted:

| Job ID | nodes | time (hrs) |
|---|---|---|
| J5 | 14 | 1 |

= J5 is submitted to run on 14 nodes for 1 hour

As such, J5 will have to span the two clusters.

In order to schedule J5, the following steps are followed. Designate the central manager 24 on cluster 1. J5 is submitted to Cluster 1. Cluster 1 tells C1 and C2 schedulers that J5 is to be scheduled. Both clusters formulate a table of free resources, created by applying local scheduling rules. The tables would have the following form:

| Cluster 1 Resource Table | | Cluster 2 Resource Table | |
|---|---|---|---|
| Time span | Free Nodes | Time span | Free Nodes |
| 0-2 | 4 | 0-1 | 2 |
| 2-3 | 0 | 1-4 | 6 |
| 3-N | 8 | 4-N | 8 |

The tables are sent to Cluster 1 (central manager 24). The central manager 24 combines the tables, finding the overlap in the timing patterns to develop the following table:

| Combined Resource Table | | | |
|---|---|---|---|
| Time Span | C1 Free nodes | C2 Free Nodes | Total Free Nodes |
| 0-1 | 4 | 2 | 6 |
| 1-2 | 4 | 6 | 10 |
| 2-3 | 0 | 6 | 6 |
| 3-4 | 8 | 6 | 14 |
| 4-N | 8 | 8 | 16 |

Using the Combined Resource Table, the central manager 24 can locate the first available slot to allow J5 to start. The first slot is the 3-4 slot so J5 (14 nodes, 1 hour) starts as illustrated in FIG. 7.

At this point, J5 is now scheduled to run across the two different clusters. Note that the determination of the start time for job J5 was arrived at with a single message to all the clusters and a single message back from each of the clusters to the central manager 24. Direct communication of these messages may occur between clusters, or distributed techniques (parallel scatter and gather) could be used for a large number of clusters and potentially large tables.

Between the times the clusters return the local Cluster Resource Tables and the central manager 24 returns the start time of the shared processing job 26, the resources at the local clusters should be temporarily reserved. As a result, for this period, local scheduling at the clusters should be suspended. Once the message to schedule the shared processing job 26 arrives, local scheduling may resume.

Note that the example shows simple node availability as the only resource scheduled for the shared processing job 26. Clearly, any resource set could be included in the resource match controlled by the local managers 28 and 30. In the current incarnation of Loadleveler (and other parallel batch schedulers), there are many resource elements (such as physical memory and software locked licenses) that may be included when checking when a job will start. These resource computations may still be used with the system and method described in this disclosure.

The example shows the initial placement of the shared processing job 26. However, as queues evolve, the shared processing job 26 placement may have to change as well. For example, if J1 on Cluster 1 finishes early, the shared processing job 26, J5, might have a chance to start earlier. So, as events change at the local clusters 12a-12n and 16a-16n, these events will trigger re-computations of the shared processing job 26 schedule. If such an event occurs at a local cluster 12a-12n and 16a-16n, the central manager 24 will be notified and another round of scheduling of the shared processing job 26 will be performed to determine if the schedule of the shared processing job should change or remain the same.

In one embodiment, the system 10 uses simple message handshaking. For example, for each shared processing job 26, there is one message to all clusters and one message back from each cluster. The return message from the clusters contains the Cluster Resource Tables.

In one embodiment, the system 10 uses existing, high performance parallel batch schedulers. The parallel batch schedulers already in use at the local clusters are used for the difficult task of backfill scheduling and resource matching. In effect, the described solution parallelizes currently existing batch schedulers for the shared processing job 26.

In one embodiment, the system 10 allows shared processing job 26 to be run across several clusters (not limited to two). Because of the parallel nature, the algorithm should scale well across a large number of local clusters.

In one embodiment, the system 10 preserves techniques in existing parallel batch schedulers, e.g. job classes, priority, etc. Most of the current backfill scheduler techniques are allowable using the system 10 and the associated methods.

In one embodiment, the system 10 addresses the coordination between parallel job schedulers on individual high performance cluster machines 12a-12n and 16a-16n that are interconnected on a grid. In order to schedule a single shared processing job 26 running across all of the clusters (a job scaled across the clusters), it is necessary to have some mechanism to coordinate the resource allocation, the start time, and subsequent control of job components at individual clusters. Since the clusters are already running parallel backfill schedulers, the local schedulers can be used to determine when local resources may be available for the scale-across job, in effect, distributing the difficult task of establishing a start time for the shared processing job 26.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and other embodiments are intended to be included within the scope of the appended claims.

That which is claimed is:

1. A system to improve cluster machine processing, the system comprising:
a central manager selected from a plurality of local managers;
a plurality of interconnected computers that process data as one if necessary;
a first local manager from the plurality of local managers to schedule data processing at the plurality of interconnected computers;
at least one other plurality of interconnected computers that process data as one if necessary; and
a second local manager from the plurality of local managers to schedule data processing at the at least one other plurality of interconnected computers;
wherein the central manager is configured to receive, in parallel, resource availability and backfill scheduling from the first local manager and second local manager and to control what data processing on a shared processing job is performed by said plurality of interconnected computers and said at least one other plurality of interconnected computers, while said first local manager and said second local manager each controls any respective local processing jobs, the central manager configured to schedule the shared processing job by determining overlap in timing patterns of the plurality of interconnected computers and the other plurality of interconnected computers based on the resource availability and the backfill scheduling from the first local manager and second local manager; and
wherein local scheduling by the first local manager at the plurality of interconnected computers and by the second local manager at the other plurality of interconnected computers is suspended while the central manager schedules the shared processing job.

2. The system of claim 1 wherein said plurality of interconnected computers and said at least one other plurality of interconnected computers can each perform any respective local processing jobs in parallel to the shared processing job.

3. The system of claim 1 wherein said plurality of interconnected computers, said at least one other plurality of interconnected computers, and said central manager are connected via a communications network.

4. The system of claim 1 wherein said central manager schedules the shared processing job based upon the backfill scheduling provided by said first local manager, and the at least one other backfill scheduling provided by said second local manager.

5. The system of claim 4 wherein the backfill scheduling provided by said first local manager and the at least one other backfill scheduling provided by said second local manager are supplied in parallel to said central manager.

6. The system of claim 4 wherein said central manager reserves at least one of time and resources on said plurality of interconnected computers and said at least one other plurality of interconnected computers to perform the shared processing job.

7. The system of claim 1 wherein said first local manager suspends backfill scheduling until said central manager distributes the shared processing job; and wherein said second local manager suspends at least one other backfill scheduling until said central manager distributes the shared processing job.

8. A method to improve cluster machine processing, the method comprising:

sending a request to perform a shared processing job from a central manager computer selected from a plurality of local managers, the plurality of local managers including a first local manager to schedule data processing at a plurality of interconnected computers and a second local manager to schedule data processing at an at least one other plurality of interconnected computers, the central manager configured to receive, in parallel, resource availability and backfill scheduling from the first local manager and second local manager and to control what data processing on a shared processing job is performed by the plurality of interconnected computers and the at least one other plurality of interconnected computers, while the first local manager and the second local manager each controls any respective local processing jobs, the central manager configured to schedule the shared processing job by determining overlap in timing patterns of the plurality of interconnected computers and the other plurality of interconnected computers based on the resource availability and the backfill scheduling from the first local manager and second local manager;
determining available resources for the shared processing job by the first local manager at the plurality of interconnected computers and by the second local manager at the at least one other plurality of interconnected computers;
reserving resources via the central manager on each of the plurality of interconnected computers and the at least one other plurality of interconnected computers based upon the determined available resources for the shared processing job; and
scheduling by the central manager the shared processing job by determining overlap in timing patterns of the plurality of interconnected computers and the other plurality of interconnected computers, wherein local scheduling at the plurality of interconnected computers and the other plurality of interconnected computers is suspended while the central manager schedules the shared processing job.

9. The method of claim 8 further comprising performing any local processing jobs in parallel to the shared processing job at the plurality of interconnected computers and the at least one other plurality of interconnected computers.

10. The method of claim 8 further comprising suspending backfill scheduling on each of the plurality of interconnected computers and the at least one other plurality of interconnected computers until the central manager computer distributes the shared processing job.

11. The method of claim 10 further comprising resuming backfill scheduling on each of the plurality of interconnected computers and the at least one other plurality of interconnected computers when the central manager computer distributes the shared processing job.

12. The method of claim 8 wherein backfill scheduling provided by both the plurality of interconnected computers and the at least one other plurality of interconnected computers is provided in parallel.

13. The method of claim 8 further comprising controlling portions of the shared processing job performed by each of the plurality of interconnected computers and the at least one other plurality of interconnected computers via the central manager computer during the shared processing job.

14. A computer program product embodied in a non-transitory computer readable medium, storing computer codes to improve cluster machine processing, configured to cause the cluster machine to:

send a request to perform a shared processing job from a central manager computer selected from a plurality of local managers, the plurality of local managers including a first local manager to schedule data processing at a plurality of interconnected computers and a second local manager to schedule data processing at an at least one other plurality of interconnected computers, the central manager configured to receive, in parallel, resource availability and backfill scheduling from the first local manager and second local manager and to control what data processing on a shared processing job is performed by the plurality of interconnected computers and the at least one other plurality of interconnected computers, while the first local manager and the second local manager each controls any respective local processing jobs, the central manager configured to schedule the shared processing job by determining overlap in timing patterns of the plurality of interconnected computers and the other plurality of interconnected computers based on the resource availability and the backfill scheduling from the first local manager and second local manager;

determine available resources for the shared processing job by the first local manager at the plurality of interconnected computers and by the second local manager at the at least one other plurality of interconnected computers;

reserve resources via the central manager on each of the plurality of interconnected computers and the at least one other plurality of interconnected computers based upon the determined available resources for the shared processing job; and schedule by the central manager the shared processing job by determining overlap in timing patterns of the plurality of interconnected computers and the other plurality of interconnected computers, wherein local scheduling at the plurality of interconnected computers and the other plurality of interconnected computers is suspended while the central manager schedules the shared processing job.

15. The computer program product of claim 14 further comprising program code configured to: perform any local processing jobs in parallel to the shared processing job at the plurality of interconnected computers and the at least one other plurality of interconnected computers.

16. The computer program product of claim 14 further comprising program code configured to: suspend backfill scheduling on each of the plurality of interconnected computers and the at least one other plurality of interconnected computers until the central manager distributes the shared processing job.

17. The computer program product of claim 16 further comprising program code configured to: resume backfill scheduling on each of the plurality of interconnected computers and the at least one other plurality of interconnected computers when the central manager distributes the shared processing job.

18. The computer program product of claim 14 further comprising program code configured to: control portions of the shared processing job performed by each of the plurality of interconnected computers and the at least one other plurality of interconnected computers via the central manager during the shared processing job.

\* \* \* \* \*